(12) United States Patent
Mischo et al.

(10) Patent No.: US 10,465,547 B2
(45) Date of Patent: Nov. 5, 2019

(54) FLUID FLOW MACHINE USING A GASEOUS MEDIUM FOR TEMPERATURE CONTROL OF A DRY GAS SEAL

(71) Applicants: Bob Mischo, Zürich (CH); Thomas Mokulys, Xanten (DE); Martin Scholtysik, Lenzburg (CH); Reto Birrer, Gisikon (CH); Annika Klaas, Zürich (CH)

(72) Inventors: Bob Mischo, Zürich (CH); Thomas Mokulys, Xanten (DE); Martin Scholtysik, Lenzburg (CH); Reto Birrer, Gisikon (CH); Annika Klaas, Zürich (CH)

(73) Assignee: MAN Energy Solutions SE, Augsburg (DE)

( * ) Notice: Subject to any disclaimer, the term of this patent is extended or adjusted under 35 U.S.C. 154(b) by 330 days.

(21) Appl. No.: 14/808,059

(22) Filed: Jul. 24, 2015

(65) Prior Publication Data

US 2016/0024953 A1    Jan. 28, 2016

(30) Foreign Application Priority Data

Jul. 26, 2014    (DE) .................. 10 2014 011 042

(51) Int. Cl.
*F01D 11/02* (2006.01)
*F01D 11/04* (2006.01)
(Continued)

(52) U.S. Cl.
CPC .............. *F01D 11/02* (2013.01); *F01D 11/04* (2013.01); *F01D 25/10* (2013.01); *F01D 25/24* (2013.01);
(Continued)

(58) Field of Classification Search
CPC .......... F01D 11/02; F01D 11/04; F01D 25/10; F01D 25/24; F04D 29/12; F04D 29/122; F04D 29/124; F04D 29/584; F16J 15/3404
See application file for complete search history.

(56) References Cited

U.S. PATENT DOCUMENTS 3,357,706 A  *  12/1967  Wilkinson ............. F16J 15/162
                                                     277/366
3,926,442 A      12/1975  Müller
                              (Continued)

FOREIGN PATENT DOCUMENTS

CN        1261420        7/2000
CN      103459903       12/2013
                              (Continued)

OTHER PUBLICATIONS

Office Action dated May 25, 2018 which issued in the corresponding Chinese Patent Application No. 201510440321.8.
(Continued)

*Primary Examiner* — Christopher Verdier
*Assistant Examiner* — Elton K Wong
(74) *Attorney, Agent, or Firm* — Cozen O'Connor

(57) ABSTRACT

A fluid flow machine, in particular turbocompressor, with a housing, having a rotor mounted in the housing, and with a dry gas seal for sealing the rotor relative to the housing. The housing at least one recess or bore for a gaseous medium is introduced, via which the gaseous medium for temperature-controlling the dry gas seal can be conducted in the direction of the same. The gaseous medium can be directly conducted into a gas space formed between the housing and the dry gas seal via the or each recess or bore. Additionally or alternatively, the or each recess or bore receives a guide tube for the gaseous medium.

17 Claims, 5 Drawing Sheets

(51) Int. Cl.
*F01D 25/10* (2006.01)
*F04D 29/12* (2006.01)
*F04D 29/58* (2006.01)
*F16J 15/34* (2006.01)
*F01D 25/24* (2006.01)

(52) U.S. Cl.
CPC ......... *F04D 29/122* (2013.01); *F04D 29/124* (2013.01); *F04D 29/584* (2013.01); *F16J 15/3404* (2013.01)

(56) References Cited

U.S. PATENT DOCUMENTS

| | | | | |
|---|---|---|---|---|
| 4,361,334 A | * | 11/1982 | Amorese | F16J 15/162 277/366 |
| 4,721,311 A | * | 1/1988 | Kakabaker | F16J 15/162 277/369 |
| 4,749,199 A | | 6/1988 | Gresh | |
| 5,538,406 A | * | 7/1996 | Siegal | F04D 29/086 417/360 |
| 5,718,560 A | * | 2/1998 | Lorenzen | F16J 15/3404 277/361 |
| 6,131,912 A | * | 10/2000 | Azibert | F16J 15/3488 277/348 |
| 6,227,799 B1 | * | 5/2001 | Kuhn | F01D 5/081 415/115 |
| 2004/0026871 A1 | * | 2/2004 | Stephens | F16J 15/3404 277/401 |
| 2004/0100034 A1 | * | 5/2004 | Coppola | F01D 11/06 277/412 |
| 2012/0148435 A1 | * | 6/2012 | Takaki | F04C 18/086 418/201.1 |
| 2015/0118018 A1 | * | 4/2015 | Baldassarre | F16J 15/3484 415/1 |
| 2017/0044915 A1 | * | 2/2017 | Mugglestone | F01D 9/065 |

FOREIGN PATENT DOCUMENTS

| | | |
|---|---|---|
| CN | 104395653 | 3/2015 |
| DE | 2 253 512 | 5/1974 |
| DE | 10 2014 203 464 | 8/2015 |
| EP | 0 571 791 | 12/1993 |
| EP | 0 781 948 | 7/1997 |
| EP | 2 463 526 | 6/2012 |
| JP | S 55-47060 | 4/1980 |

OTHER PUBLICATIONS

Office Action dated Apr. 12, 2019 issued in Chinese Patent Application No. 201510440321.8.

* cited by examiner

FLUID FLOW MACHINE USING A GASEOUS MEDIUM FOR TEMPERATURE CONTROL OF A DRY GAS SEAL

BACKGROUND OF THE INVENTION

1. Field of the Invention

The present invention relates to a fluid flow machine.

2. Description of the Related Art

The construction of fluid flow machines designed as turbocompressors is known to the person skilled in the art. Accordingly, FIGS. 1 and 2 show different cross sections through a fluid flow machine according to the prior art in the region of a dry gas seal 1, which is positioned between a housing 2 and a rotor 3 of the fluid flow machine. According to the prior art, between the dry gas seal 1 and the housing 2 an annular assembly 4 on the stator side is arranged, wherein on the one hand between this assembly 4 and the housing 2 and on the other hand between this assembly 4 and the dry gas seal 1 a gas space 5 and 6 are formed. At least one bore 7 is introduced into the housing 2 gas. Bore 7 is needed for temperature-controlling the dry gas seal 1 and gas can be initially conducted in the direction of the arrow 8 into the gas space 5 positioned between the housing 2 and the assembly 4 to conduct the gas needed for temperature-controlling the dry gas seal 1 into the gas space 6 formed between the assembly 4 and the dry gas seal 1 via bores 9 introduced in the assembly 4. Accordingly, the gas conducted via the bores 7 of the housing is indirectly fed to the gas space 6 via the assembly 4.

In the case of fluid flow machines known from the prior art, relatively large amounts of gas and a relatively long heating-up time is required for temperature-controlling the dry gas seal 1, namely for heating the same to operating temperature. This is a disadvantage.

SUMMARY OF THE INVENTION

There is therefore a need for reducing the gas quantity and time needed for heating up the dry gas seal and providing a corresponding fluid flow machine with which temperature-controlling of the dry gas seal can be accomplished. Starting out from this, the present invention is based on creating a fluid flow machine with which the dry gas seal can be more effectively temperature-controlled.

According to a first aspect of the invention, a fluid flow machine as described. Accordingly, the gaseous medium can be conducted via the or each recess or bore directly into a gas space formed between the housing and the dry gas seal. According to the first aspect of the invention, according to which the gaseous medium can be conducted via the or each bore introduced in the housing directly into a gas space formed between the housing and the dry gas seal, the assembly of the prior art that is positioned between the dry gas seal and the housing is eliminated. Thermal energy, which according to the prior art is lost during the heating-up of the assembly positioned between the dry gas seal and the housing, can be directly utilised for heating up the dry gas seal. Because of this, the gas quantity needed for heating-up the dry gas seal and the time required are reduced.

According to an advantageous embodiment, the or each bore runs at an angle deviating from 90° to the circumferential direction on a boundary wall of the gas space on the housing side. Preferentially, the respective bore includes with the circumferential direction of the boundary wall of the gas space in the region of the bore an angle that is smaller than 80°. Because of this, the gas utilised for heating up or temperature-controlling the dry gas seal is conducted into the gas space formed between the housing and the dry gas seal subject to forming a swirl. This ensures even distribution of the gas in the gas space and thereby effective heating of the dry gas seal within a short time with low required gas quantity.

According to one aspect of the invention, the or each bore receives a guide tube for the gaseous medium. The gas quantity and time needed for heating up the dry gas seal can be reduced compared with the prior art. The guide tube absorbs less thermal energy than the housing.

According to one embodiment, a free space is formed between the respective guide tube and a wall of the bore receiving the guide tube. Preferentially, the free space is coupled to the gas space via a bore introduced in the housing or to an interior space of the guide tube via a bore introduced in the guide tube. The free space between the guide tube and the housing provides a thermal insulation for the guide tube, as a result of which heating-up of the dry gas seal can be rendered even more effective.

According to a further embodiment, the gaseous medium can be directly conducted into the gas space formed between the housing and the dry gas seal via the respective guide tube, wherein preferentially the respective guide tube projects into the gas space compared with a boundary wall of the gas space on the housing side and a section of the respective guide tube projecting into the gas space is bent over in circumferential direction and/or receives a nozzle. Because of this, the gas used for temperature-controlling or heating the dry gas seal can be particularly advantageously introduced into the gas space formed between the housing and the dry gas seal, as a result of which the effectiveness during the heating-up of the dry gas seal can be further increased.

The two aspects according to the invention can be utilised on a fluid flow machine alone or preferably combined with one another.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail with the help of the drawing without being restricted to this. There it shows:

DETAILED DESCRIPTION OF THE PRESENTLY PREFERRED EMBODIMENTS

Figure 1:
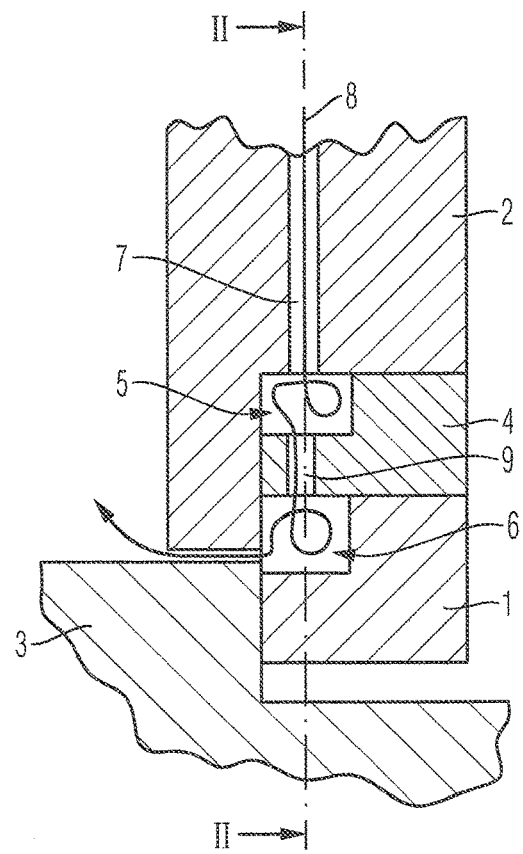
FIG. 1: is a schematic axial section through a fluid flow machine according to the prior art in the region of a dry gas seal.
Figure 2:
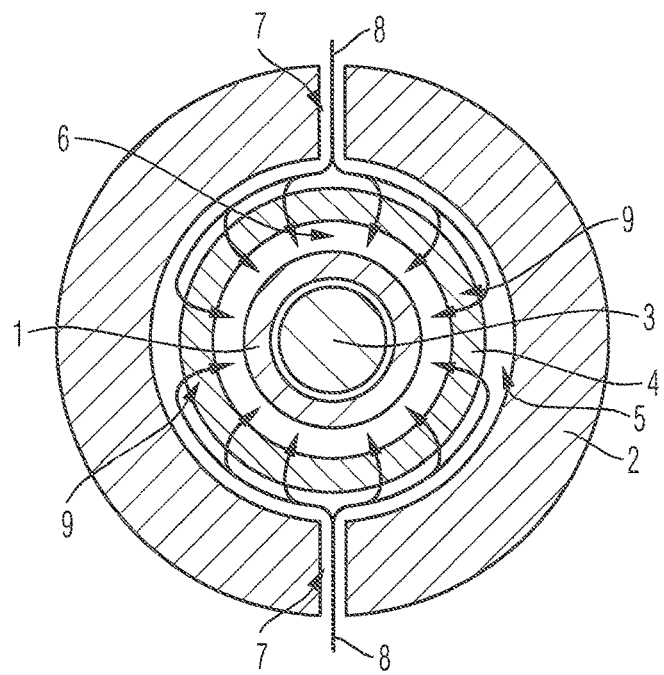
FIG. 2: is a section II-II of FIG. 1.
Figure 3:
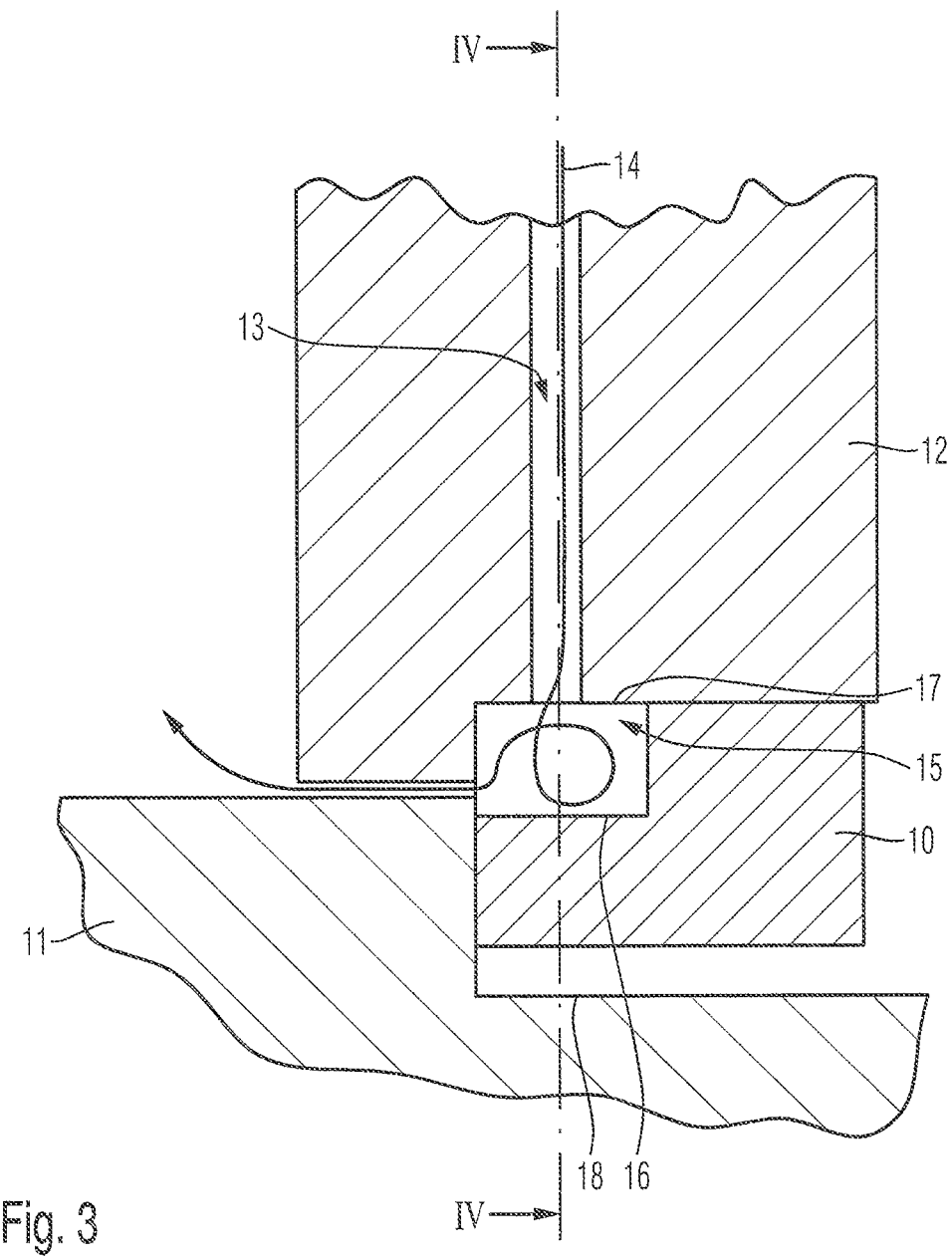
FIG. 3: is a schematic axial section through a fluid flow machine in a region of a dry gas seal.
Figure 4:
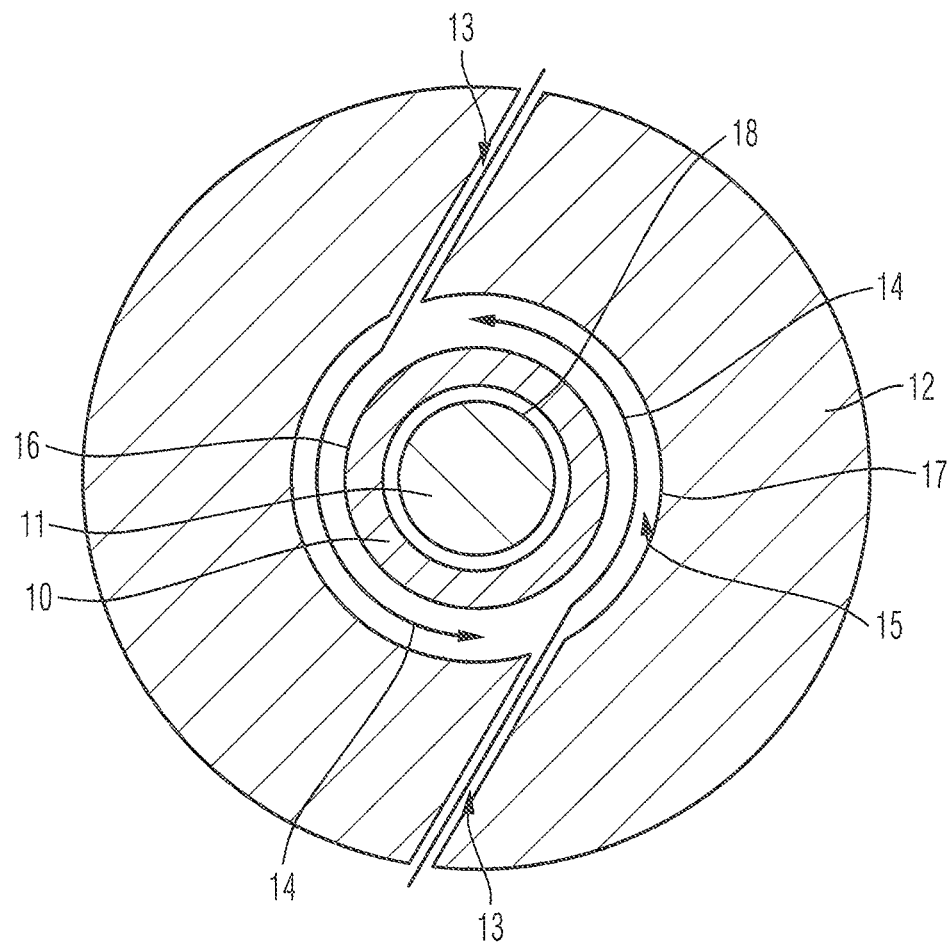
FIG. 4: is a section IV-IV of FIG. 3.

FIGS. 3 and 4 show a cross section through a fluid flow machine according to one embodiment of the invention in the region of a dry gas seal 10, which is positioned between a rotor 11 and a housing 12 of the fluid flow machine.

Via at least one recess or bore 13 introduced in the housing 12, gas, which is needed for temperature-controlling or heating the dry gas seal 10, can be conducted in the direction of the dry gas seal 10 in the direction of the arrow 14 via the housing 12.

According to the first aspect of the present invention, the component positioned according to the prior art between the dry gas seal and the housing, which on the one hand defines a gas space each between the component and the housing and on the other hand between the component and the dry gas seal, is eliminated so that accordingly via the or each bore 13 of the housing 12 the gas can be directly conducted into a gas space 15 formed between the housing 12 and the dry gas seal 10. Accordingly, no thermal energy for heating up an assembly positioned between the dry gas seal 10 and the housing 12 is lost.

According to FIGS. 3, 4, the gas space 15, formed between the housing 12 and the dry gas seal 10, is bounded by a wall 16 of the dry gas seal 10 radially inside and by a wall 17 of the housing 12 radially outside. The or each bore 13, via which the gas used for temperature-controlling the dry gas seal 10 can be conducted into the gas space 15, in this case runs at an angle deviating from 90° to the circumferential direction of the boundary wall 17 of the gas space 15 on the housing side in the region of the respective bore 13. Preferentially, the respective bore 13, namely a longitudinal centre axis of the same, includes with the circumferential direction of the boundary wall 17 in the outlet region of the bore 13 into the gas space 15 an angle that is smaller than 80°, preferentially an angle that is greater than 20° and smaller than 80°, particularly preferably an angle that is greater than 30° and smaller than 70°. It is thereby possible to conduct the gas into the gas space 15 with a defined swirl, thus providing a good distribution in the gas space 15 of the gas used for temperature-controlling the dry gas seal 10.

According to a particularly advantageous embodiment of the invention, the longitudinal center axis of the respective bore 13 of the housing 12, which is utilised for feeding the gas used for temperature-controlling the dry gas seal 10, runs tangentially to a wall 16 of the dry gas seal 10 limiting the gas space 15 radially inside or tangentially to a wall 18 of the rotor 11.

In the exemplary embodiment shown in FIGS. 3 and 4, the bores 13, which are introduced into the housing 12, are directly utilised for guiding the gas used for temperature-controlling the dry gas seal 10.

Figure 5:
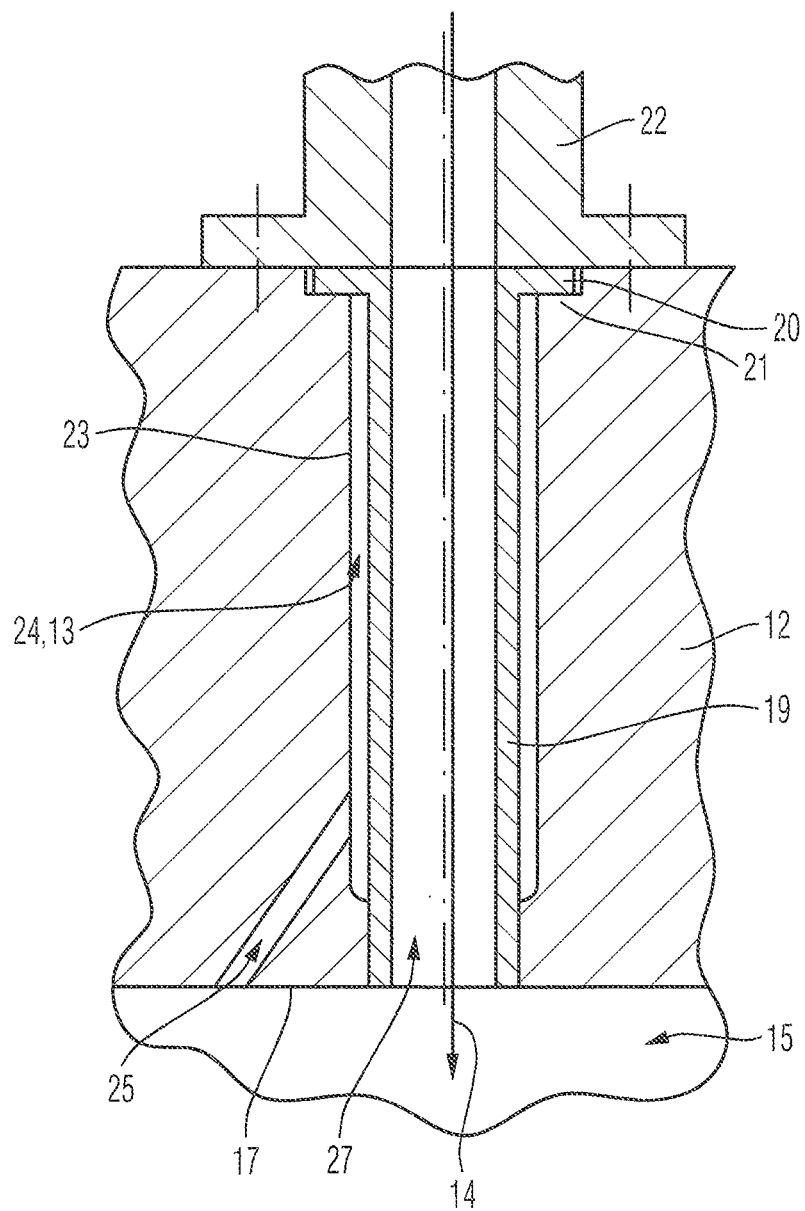
FIG. 5: is a schematic axial section through a fluid flow machine in a region of a dry gas seal.
Figure 6:
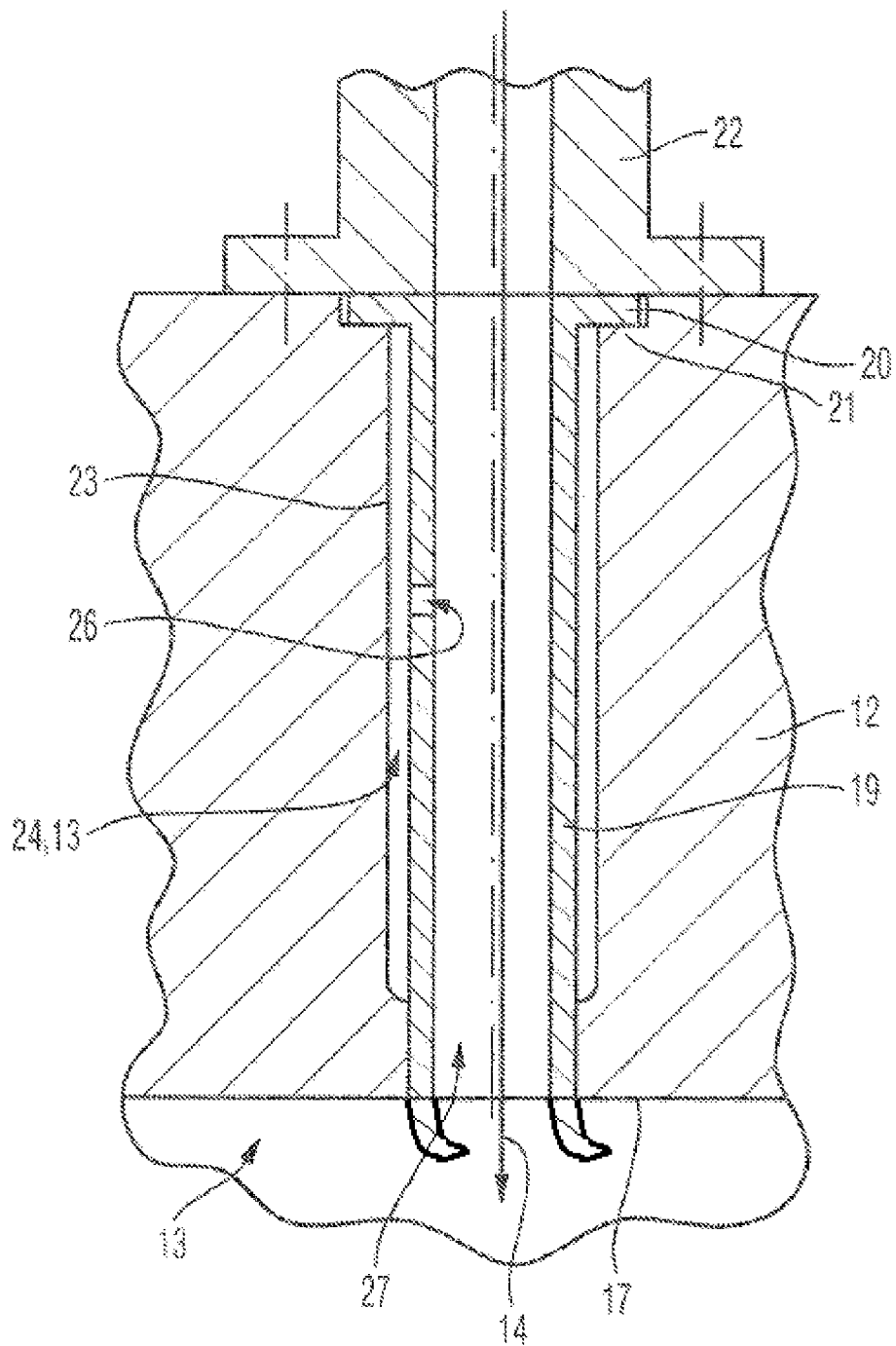
FIG. 6: a schematic axial section through a further fluid flow machine according to the second aspect of the invention in the region of a dry gas seal.

According to a second aspect of the present invention as shown in FIGS. 5 and 6 that the or each bore 13 of the housing 12 in each case receives a guide tube 19 for the gas utilised for temperature-controlling the dry gas seal 10 in order to thereby indirectly utilise the respective bore 13 for conducting gas, namely via a guide tube 19 positioned in the respective bore 13.

At an end facing away from the gas space 15, the respective guide tube 19 has a collar-like projection 20, which comes to bear against a corresponding shoulder or stop 21 of the housing 12 and serves for positioning the guide tube 19 in the respective bore 13.

At this end of the guide tube 19 a gas line 22 follows according to FIGS. 5, 6, which serves for feeding the gas used for temperature-controlling the dry gas seal 10 in the direction of the respective bore 13 or the guide tube 19 positioned in the respective bore 13.

According to FIGS. 5, 6, the respective guide tube 19 is positioned in the respective bore 13 such that between the respective guide tube 19 and a wall 23, which bounds the bore 13 receiving the guide tube 19, seen in axial direction of the guide tube 19 a free space 24 is formed at least in sections, which insulates the guide tube 19 with respect to the housing 12. It can thereby be prevented that the gas conducted through the guide tube 19 indirectly heats the housing 12 via the guide tube so that accordingly an energy loss caused by this can be minimised.

In the exemplary embodiment of FIG. 5, this free space 24 between the guide tube 19 and the wall 23 of the bore 13 is coupled to the gas space 15 via a bore 25 introduced in the housing 12. Because of this, pressure equilibrium in the free space 24 can be ensured.

FIG. 6 shows a configuration in which the guide tube 19 has a bore 26 via which the free space 24 is coupled to an interior space 27 of the guide tube 19, which serves for conducting gas.

In the exemplary embodiments shown in FIGS. 5 and 6, the respective guide tube 19 terminates flush with the boundary wall 17 of the gas space 15 on the housing side. Compared with this it is also possible that the guide tube 19 projects into the gas space 15 relative to the boundary wall 17, wherein the section of the respective guide tube 19 projecting into the gas space 15 is then preferentially bent over in circumferential direction. Conducting the gas into the gas space 15 can thereby be further improved.

The section terminating flush with the wall 17 or section projecting into the gas space 15 relative to the wall 17 of the respective guide tube 19 can receive a nozzle via which the gas can ultimately be conducted into the gas space 15.

Both aspects according to the invention described above are preferably utilised on a fluid flow machine combined with one another and serve for reducing the gas quantity and time needed for temperature-controlling or heating-up the dry gas seal 10. The invention is preferentially utilised on turbocompressors.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fluid flow machine, comprising:
a housing having defined therein at least one of a recess and a bore for a gaseous medium;
a rotor mounted in the housing; and
a dry gas seal for sealing the rotor relative to the housing directly adjacent to the rotor and the housing, a single surface of the dry gas seal being in direct contact with the housing and a second surface of the dry gas seal that is perpendicular to the single surface being in direct contact with the rotor,
wherein the gaseous medium provides temperature control for the dry gas seal and is directly conducted into a gas space formed between the housing and the dry gas seal via the at least one of the recess and the bore,
wherein the gas space formed between the housing and the dry gas seal is bounded on two perpendicular sides by the housing and on two perpendicular sides by the dry gas seal.

2. The fluid flow machine according to claim 1, wherein the at least one of the recess and the bore is arranged at an angle deviating from 90° to a circumferential direction of a boundary wall of the gas space on a housing side in a region of the at least one of the recess and the bore.

3. The fluid flow machine according to claim 2, wherein the angle is smaller than 80° in the region of the at least one of the recess and the bore.

4. The fluid flow machine according to claim 3, wherein the angle is smaller than 80° and greater than 20°.

5. The fluid flow machine according to claim 4, wherein the angle is smaller than 70° and greater than 30°.

6. The fluid flow machine according to claim 2, wherein the at least one of the recess and the bore is arranged substantially tangentially to one of a boundary wall of the rotor and a boundary wall of the dry gas seal radially bounding the gas space.

7. The fluid flow machine according to claim 1, wherein dry gas seal is L-shaped in cross section.

8. A fluid flow machine, comprising:
a housing defining at least one of a recess and a bore for a gaseous medium, wherein the at least one of the recess and the bore has a shoulder at a first end and opens to a gas space at a second end;
a guide tube for the gaseous medium arranged in the at least one of the recess and the bore, wherein the guide tube comprises a collar configured to seat in the shoulder and extends to at least the second end of the one of the recess and the bore;
a rotor mounted in the housing; and
a dry gas seal for sealing the rotor relative to the housing, wherein the gaseous medium is conducted into the gas space;
wherein the gas space is bounded by the housing and the dry gas seal, the dry gas seal in contact with the housing and the rotor via perpendicular walls, and the gas space configured to temperature control the dry gas seal.

9. The fluid flow machine according to claim 8, wherein a free space is formed between the guide tube and a wall of the at least one of the recess and the bore that receives the guide tube.

10. The fluid flow machine according to claim 9, wherein the free space is coupled to the gas space via a second bore defined by the housing.

11. The fluid flow machine according to claim 9, wherein the free space is coupled to an interior space of the guide tube via a bore introduced in the guide tube.

12. The fluid flow machine according to claim 8, wherein the gaseous medium is directly conducted into the gas space formed between the housing and the dry gas seal via the guide tube.

13. The fluid flow machine according to claim 12, wherein the guide tube terminates flush with a boundary wall of the gas space on a housing side.

14. The fluid flow machine according to claim 13, wherein a section of the guide tube facing the gas space is configured to receive a nozzle.

15. The fluid flow machine according to claim 12, wherein the guide tube projects into the gas space relative to the boundary wall of the gas space on a housing side.

16. The fluid flow machine according to claim 15, wherein a section of the guide tube facing the gas space is configured to receive a nozzle.

17. A fluid flow machine, comprising:
a housing defining at least one of a recess and a bore for a gaseous medium;
a guide tube for the gaseous medium arranged in the at least one of the recess and the bore;
a rotor mounted in the housing; and
a dry gas seal for sealing the rotor relative to the housing,
wherein the gaseous medium is conducted into a gas space formed between the housing and the dry gas seal and temperature controls the dry gas seal,
wherein the gaseous medium is directly conducted into the gas space formed between the housing and the dry gas seal via the guide tube,
wherein the guide tube projects into the gas space relative to the boundary wall of the gas space on a housing side
wherein a section of the guide tube projecting into the gas space is bent over in circumferential direction.

* * * * *